Figure 1:
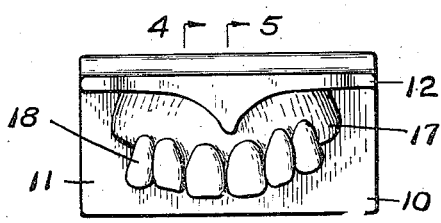

Jan. 12, 1943.  J. A. SAFFIR  2,308,457
MEANS FOR MOUNTING ARTIFICIAL TEETH
Filed Aug. 22, 1941

INVENTOR
BY  JACOB A. SAFFIR
W. H. Sullivan
ATTORNEY

Patented Jan. 12, 1943

2,308,457

UNITED STATES PATENT OFFICE 2,308,457

MEANS FOR MOUNTING ARTIFICIAL TEETH

Jacob A. Saffir, Chicago, Ill., assignor to The Dentists' Supply Company of New York, New York, N. Y., a corporation of New York Application August 22, 1941, Serial No. 407,852

3 Claims. (Cl. 32—71)

This invention relates to artificial teeth, and more particularly to a novel means and method of carding and mounting artificial teeth at the factory for distribution to the dental supply houses, and subsequently to the dentists.

It is a primary object of this invention to provide means for mounting artificial teeth so that when they are received by the dentist they can be placed on the ridge in the mouth of an edentulous person in the approximate position that they will occupy in their permanent state, thereby affording the dentist and patient a preview which is practically identical with the appearance of the teeth in the finished plate.

Another object of this invention is to simplify for the dentist a choice of the proper teeth for a patient whereby the dentist can compare the size and shape of the models of a patient's mouth with the size of the arch built into the tooth mounting, and thereby judge the relative width and form of the teeth he should use with considerably greater accuracy than was heretofore possible since the size and shape of the arch most frequently determines the size and shape of the replacing teeth.

Another object of this invention is to provide a set-up furnished by the factory for the use of a dentist in a trial plate, thereby saving considerable time which would normally be required if the dentist set the teeth up himself.

Another object of this invention is to provide set-up of anterior teeth for the dentist which are more artistic than set-ups which the average dentist is capable of preparing himself, and enabling the dentist to obtain the benefit of the services and expert knowledge of persons particularly proficient in the art of setting up teeth, resulting in greater esthetics in the plate work of the average person.

A further object of this invention is to furnish artificial teeth set up in a base plate which can be altered in shape by the application of a slight amount of heat and/or pressure to adapt the base plate to the model of a patient's mouth, or to the mouth itself, whereby tests can be quickly made from a study of the articulation of these artificial teeth with other teeth in the mouth.

A further object of the invention is to furnish artificial teeth mounted in such a manner that the mounting can be incorporated in the other parts on the model and become to all purposes a finished part of the temporary base plate.

According to the invention a support is provided having a ridge formed thereon simulating an average ridge found in an edentulous mouth. A base plate formed of wax or a similar substance is fitted over and conforms to the ridge and anterior teeth are set in the base plate. The support and base plate are assembled at the factory for delivery to the dental supply house, and subsequently to the dentist. It has been found that the shape and size of the ridge or arch form most frequently determines the correct size and shape of the artificial teeth to be used. Thus, experts at the factory who are skilled in the preparation of artistic set-ups can prepare set-ups of anterior teeth which are most suitable as to form, size, and appearance for a particular ridge. A sufficient range of set-ups are provided to care for the average ridges encountered. The dentist selects a set-up associated with a ridge which most closely conforms to the ridge on the model of the patient's mouth or the ridge in the edentulous mouth itself.

The base plate of the set-up is formed of a substance, such as wax, which can be altered in shape, either by slight pressure or by a slight amount of heating, whereby the base plate can be accurately shaped to the ridge of a patient.

This removable base plate can be incorporated in the final trial denture, and it is not intended merely for selection purposes. Although the set-up when shipped from the factory includes only anterior teeth, it is contemplated that additional base plate material may be added to provide a complete denture, and that posterior teeth can be set in the base plate by the dentist in the usual manner.

Figure 2:
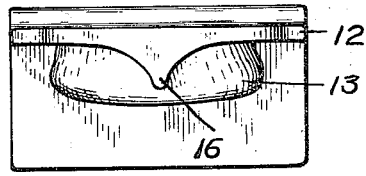
Figures 3, 4, 5:
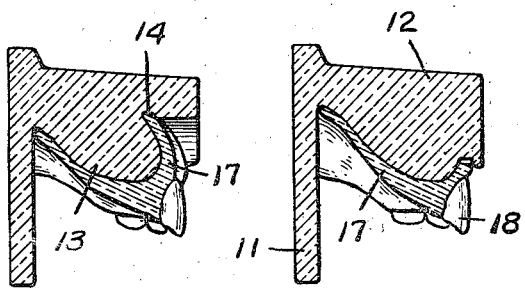
Figure 6:
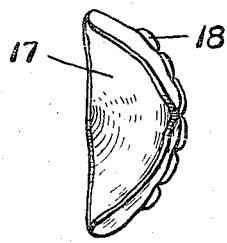
Figure 7:
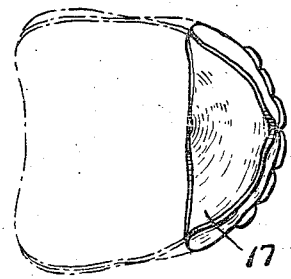
Figure 8:
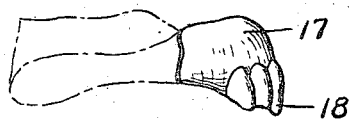

The drawing illustrates an embodiment of the invention and the views therein are as follows:

Figure 1 is a plan view of my device having a partial base plate with anterior teeth set therein mounted on the support, Figure 2 is a plan view of the support, Figure 3 is a front elevational view of the support, Figure 4 is a section taken along the line 4—4 of Figure 1, Figure 5 is a section taken along the line 5—5 of Figure 1, Figure 6 is a plan view of the base plate and teeth, Figure 7 is a plan view of a complete base plate, and Figure 8 is a side elevational view of the base plate illustrated in Figure 7.

Referring now to the drawing, I have indicated at 10 a support, which is generally L-shaped in cross-section, to provide a base 11 and and an up standing back 12. The particular material used in forming the support constitutes no essential part of my invention, and any suitable material may be used. However, I have found plastic resins to be highly suitable for this purpose, and I preferably color the support to simulate the natural gum color.

A ridge or arch form 13 extends from back 12. Arcuate grooves 14 are preferably provided above ridge 13 for receiving the peripheral portions of the base plate, the grooves being divided by a generally V-shaped projection 16 adapted to fit within the frenum notch of the base plate.

The base plate, generally indicated at 17, is formed of a material, such as wax, and conforms to and is adapted to telescope over arch 13. Anterior artificial teeth indicated at 18 are set in the base plate material in the usual manner.

As previously explained, the shape and size of ridge 13 largely determines the shape and size of the anterior teeth which will be used in the finished plate. In other words, the dentist by comparing the typal form of the arch of the model of the patient with the typal form of the arch or ridge 13 can be more certain of picking harmonious teeth.

At present, there are three major classifications as to tooth form:

1. Square
2. Tapering
3. Ovoid.

Also, the following combination typal forms:

4. Square tapering
5. Reverse tapering
6. Ovoid square tapering
7. Ovoid square
8. Ovoid tapering
9. Ovoid reverse tapering It is often difficult to distinguish some of the above classes by looking at the teeth themselves. However, comparison of the shape of the ridge 13 on the support 10 and the ridge on a model of the patient's mouth will simplify choosing the correct teeth.

The use of the device will now be described: At the factory, supports 10 having a variety of ridges 13 formed thereon will be provided. The ridges will vary in size and form to simulate as closely as possible the average natural ridges found in the mouths of edentulous persons. Experts skilled in setting up teeth will choose anterior teeth which are most harmonious with a particular ridge as to size and shape and set these teeth in a base plate conforming to said ridge. Of course, teeth of the same size and shape may vary as to shade or color. These supports and base plates are furnished to dental supply houses, and the dentist can then select a support and base plate most closely conforming to the ridge on the model of a patient's mouth. The base plate can then be tried either on the model or the ridge of the mouth itself, and if necessary, the material of the base plate can be slightly altered in shape by applying a slight amount of heat to accurately fit a ridge. In order to hold the base plate in position so that both the patient and dentist may have a clear preview to indicate how the teeth will appear in the finished plate a soft low heating wax may be applied to the inner surface of the base plate which will temporarily hold the base plate in contact with the ridge. The try-in helps to check the length of bite, the fullness or lack of fullness of the setting, the lip line, and the length of high and low lip line. Also, the cuspid to cuspid relation can be checked by the width of the arch.

The denture after a proper fitting has been achieved is employed as a part of the temporary base plate, and the teeth will be incorporated in the finished plate. Heretofore, tooth holders have been provided to hold teeth but had no function other than to show the size and color of the teeth, although some holders permitted the teeth to be held up under the lips of the patient. Prior tooth holders with which I am familiar were not intended for utility insofar as adapting the teeth displayed to the actual ridge or model, and subsequently as part of the denture or restoration.

The arrangement as heretofore described not only saves the dentist a considerable amount of time resulting in economy for both the patient and dentist but it enables more artistic set-ups to be provided. Heretofore, it has been common practice to try several different sets of teeth for the same patient, and an hour or more was required for each trial set-up. When the teeth are already mounted as described only a few minutes are required for each try-in, and a dozen sets can be tried in during a relatively short period. Under these circumstances, there is a greater tendency for the dentist to employ a wider selection, and to choose the most harmonious setting.

Referring now to Figures 7 and 8, I have illustrated the base plate 17 and teeth 18 incorporated in a complete base plate. Base plate material similar to that employed in forming the base plate 17 may be united with base plate 17 and shaped to form a complete temporary plate. Posterior teeth may then be set in the completed base plate in the usual manner. The temporary base plate and attached teeth will then be invested and the finished plate will be formed in a well known manner. Although rugae have not been shown it is understood that they may be provided in the base plate.

If a particular setting of teeth is not harmonious the material of base plate 17 may be softened by the application of heat, and one or more teeth initially set in the base plate 17 may be removed and replaced by teeth which will give a more harmonious setting.

Although I have shown and described a preferred form of my invention I contemplate that numerous and extensive departures may be made therefrom without departing from the spirit of my invention and the scope of the appended claims.

The invention is hereby claimed as follows:

1. Mounting means for artificial teeth comprising a rigid support having a ridge formed thereon closely conforming to a natural ridge in the mouth of an edentulous person, a base plate of deformable material conforming to said ridge and detachably mounted thereon, and anterior artificial teeth set in the base plate which are harmonious as to form with the typal form of the ridge.

2. Mounting means for artificial teeth comprising a rigid support having an upstanding back, a ridge extending from said back closely conforming to a natural ridge in the mouth of an edentulous person, a base plate conforming to said ridge and detachably mounted thereon, the support back having a groove therein for receiving peripheral portions of the base plate, and artificial teeth set in the base plate which are harmonious in size and shape with said ridge.

3. Mounting, shipping and selecting means for artificial teeth comprising a support of rigid material having a ridge formed thereon conforming in size and shape to an average natural anterior ridge, a base plate formed of wax-like material conforming to said ridge and mounted thereon, anterior artificial teeth set in the base plate which are harmonious in size and shape with the ridge, the support, base plate and teeth being associated as described for shipment to a dentist, the base plate and teeth being removable from the support as a unit for placement in the mouth of an edentulous patient for selecting anterior teeth, and the base plate material being deformable to conform to the natural ridge of said patient.

JACOB A. SAFFIR.